(12) United States Patent
Rahouti et al.

(10) Patent No.: US 11,411,872 B2
(45) Date of Patent: Aug. 9, 2022

(54) NETWORK LATENCY OPTIMIZATION

(71) Applicant: University of South Florida, Tampa, FL (US)

(72) Inventors: Mohamed Rahouti, Tampa, FL (US); Kaiqi Xiong, Tampa, FL (US); Yufeng Xin, Tampa, FL (US); Nasir Ghani, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/069,844

(22) Filed: Oct. 13, 2020

(65) Prior Publication Data

US 2021/0112008 A1 Apr. 15, 2021

Related U.S. Application Data

(60) Provisional application No. 62/914,263, filed on Oct. 11, 2019.

(51) Int. Cl.
*H04L 47/12* (2022.01)
*H04L 45/02* (2022.01)

(52) U.S. Cl.
CPC ............. *H04L 47/12* (2013.01); *H04L 45/02* (2013.01)

(58) Field of Classification Search
CPC ......... H04L 47/12; H04L 45/02; H04L 45/26; H04L 45/64; H04L 47/283; Y02D 30/00
See application file for complete search history.

(56) References Cited

U.S. PATENT DOCUMENTS

| | | | | |
|---|---|---|---|---|
| 2015/0071108 | A1* | 3/2015 | Lumezanu | H04L 43/0852 370/253 |
| 2016/0380892 | A1* | 12/2016 | Mahadevan | H04L 45/02 370/389 |
| 2017/0295088 | A1* | 10/2017 | van der Kluit | H04L 45/124 |
| 2019/0260658 | A1* | 8/2019 | Gell | G06F 3/064 |
| 2019/0356595 | A1* | 11/2019 | Avidar | G01C 15/004 |
| 2020/0067828 | A1* | 2/2020 | Liu | H04L 45/3065 |

(Continued)

OTHER PUBLICATIONS

Cai et al., "ASA-routing: A-Star Adaptive Routing Algorithm for Network-on-Chips," InInternational Conference on Algorithms and Architectures for Parallel Processing, Nov. 15, 2018, 187-198.

(Continued)

*Primary Examiner* — Donald L Mills
(74) *Attorney, Agent, or Firm* — Fish & Richardson P.C.

(57) ABSTRACT

The centralized control capability of Software Defined Networking (SDN) presents a unique opportunity for enabling Quality of Service (QoS) routing. For delay sensitive traffic flows, a QoS mechanism efficiently computes path latency and minimizes a controller's response time. At the core of the challenges is how to handle short term network state fluctuations in terms of congestion and latency while guaranteeing the end-to-end latency performance of networking services. The disclosed technology provides a systematic framework that considers active link latency measurements, efficient statistic estimate of network states, and fast adaptive path computation. The disclosed technology can be implemented, for example, as an SDN controller application, and can find optimal end-to-end paths with minimum latency and significantly reduce the control overhead.

20 Claims, 8 Drawing Sheets

(56) References Cited

U.S. PATENT DOCUMENTS

2020/0177611 A1* 6/2020 Bharrat ................ H04L 41/142

OTHER PUBLICATIONS

Chin et al., "Applying software-defined networking to minimize the end-to-end delay of network services," ACM SIGAPP Applied Computing Review, Apr. 30, 2018, 18(1): 12 pages.

Chowdhury et al., "Payless: A low cost network monitoring framework for software defined networks," In2014 IEEE Network Operations and Management Symposium (NOMS), May 5, 2014, 9 pages.

Das et al., "An adaptive framework for QoS routing through multiple paths in ad hoc wireless networks," Journal of Parallel and Distributed Computing, Feb. 1, 2003, 63(2): 21 pages.

Kumar et al., "End-to-end network delay guarantees for real-time systems using sdn," In2017 IEEE Real-Time Systems Symposium (RTSS), Dec. 5, 2017, 12 pages.

\* cited by examiner

NETWORK LATENCY OPTIMIZATION

CROSS-REFERENCE TO RELATED APPLICATIONS

This application claims priority to U.S. Provisional Application Ser. No. 62/914,263, which was filed on Oct. 11, 2019, and is entitled "NETWORK LATENCY OPTIMIZATION," the contents of which, including appendices and all other materials filed therewith, are incorporated herein by reference.

STATEMENT OF FEDERALLY SPONSORED RESEARCH

This invention was made with government support 1633978 awarded by the National Science Foundation. The Government has certain rights in the invention.

BACKGROUND

Software-Defined Networking (SDN) has become a popular network architecture for facilitating network management and control as well as enabling innovation in communication systems. It provides a logically centralized and global view of network resources by decoupling its data plane from its control plane. SDN also simplifies programmability by adopting programmable interfaces to insert and push forwarding rules in SDN-enabled switches (e.g., Open vSwitch) such as XMPP protocol and OpenContrail besides OpenFlow (OF). The controller's global view over flows is contributory to any SDN-enabled application such as a QoS-aware path selection to improve latency and network throughput, traffic engineering, and flow analysis for intrusion detection.

While SDN-enabled forwarding devices such as Open vSwitch (OVS) have the capability to collect a broad range of per-flow statistics, such as bytes and duration based on flow entries, an SDN controller procures different flow statistics and topology information.

SUMMARY

The disclosed technology is generally directed to a software-defined networking-based framework for end-to-end latency optimization. In particular, the disclosed technology is generally directed to latency-sensitive applications, where SDN provides the opportunity to accomplish QoS-aware path selection. For this, per flow statistics can be used and there are different raw latency data collection mechanisms with different overhead trade-offs. According to OF specifications, the flow statistics collection (FSC) can be done by the controller from switches through two mechanisms called push-based and pull-based.

In the first mechanism, the controller can passively utilizes received reports of flows in active switches to learn statistics of current flows. The limitation associated with this mechanism can be that many switches will not report per-flow statistics until flow entries time out and therefore, switches fall short of support for the push-based mechanism. The second mechanism can be widely deployed by SDN-enabled applications. It may not imply any significant overhead on both hardware and software of switches and allows the controller for an efficient control over the volume of a statistics collection report. The controller can generate an FSC request (i.e., in the form of Read-State message) to obtain per-flow statistics in a particular switch. The disclosed framework can adopt the pull model to collect raw per-link latency data and can use a sliding window to control the time frame of statistics collection along with an adaptive A* for heuristic path search and selection to minimize control plane overheads and optimize E2E communication delay.

The disclosed technology, which may be referred to in this document as "LatencySmasher," can include an SDN-based framework, which utilizes a per link latency active measurement technique for a systematic minimization of E2E delay. Specifically, such a flow engineering approach can be based on an empirical latency model to estimate per-link latencies as well as calculate and select the optimal paths through, for example, an adaptive A* algorithm in order to minimize delay for E2E network traffic delivery. This technology can include an E2E delay optimization approach for the configuration of an SDNenabled environment, and can experimentally evaluate the proposed framework.

In one implementation, a network latency optimization system includes a statistics collection processor configured to receive network topology information for a plurality of end nodes, and determine, for a pair of end nodes, one or more communication statistics. The network latency optimization system can further include a time series based latency estimation processor configured to determine, for a path between the pair of end nodes, an estimated link latency, based on the received network topology information. The network latency system can additionally include a path selection processor configured to determine an optimal path between the pair of end nodes, in response to the estimated link latency being less than or equal to a current link latency between the pair of end nodes.

Such a network latency optimization system can optionally include one or more of the following features. The one or more communication statistics can include one or more of a per-link latency, a transmission speed, a reception speed, and a link utilization. Determining the one or more communication statistics for the plurality of end nodes can include determining a current link latency in a path between a pair of end nodes, the current link latency being based on an initial timestamp of a link layer discovery protocol (LLDP) packet, a trip timestamp, a latency in a neighboring switch that receives and sends out the LLDP packet to a next switch, and a latency in the next switch. Determining the estimated link latency for the path between the pair of end nodes can include using an exponentially weighted moving average model with a selected exponential weight and a selected window size, the exponential weight and the window size being selected based on network topology dynamics and statistics collection overhead. Determining the optimal path between the pair of end nodes can include using a best-first search, and maintaining (i) a first list of nodes that have been visited but not expanded, and (ii) a second list of nodes that have been visited and expanded, with successor nodes having been explored and placed in the first list.

In another implementation, a method for minimizing end-to-end latency within a software defined network includes receiving network topology information for a plurality of end nodes, and determining, for a pair of end nodes, a current link latency between the pair of end nodes. The method can additionally include determining, for a path between a pair of end nodes, an estimated link latency, based on the received network topology information. The method can further include determining an optimal path between the pair of end nodes, in response to the estimated link latency being less than or equal to the current link latency between the end nodes, and updating the software defined network to include the optimal path between the pair of end nodes.

Other features, aspects and potential advantages will be apparent from the accompanying description and figures.

DESCRIPTION OF DRAWINGS

Like reference symbols in the various drawings indicate like elements.

DETAILED DESCRIPTION

The disclosed technology can provide a networking-based framework for end-to-end latency optimization. Such a framework can evaluate any of a variety of factors in performing network optimizations, such as active link latency measurements, heuristic and adaptive path computation solutions, and/or efficient statistic estimation of network states. The disclosed framework can be implemented, for example, as an SDN controller application.

The disclosed technology can solve any of a variety of networking-related problems. For example, for delay sensitive networking-enabled applications (e.g., emergency response systems and video steaming), a Quality of Service (QoS) mechanism can rely upon reliable calculations for route latency and optimizing controller's response time. The challenge presented by this situation, though, is how to handle short term network state changes with regard to congestion and latency while ensuring a minimal end-to-end delay of networking traffic delivery. The disclosed technology can provide a solution to this, and/or other, problems.

For instance, as handling short term network state fluctuations in terms of congestion and latency while guaranteeing the end-to-end latency performance of networking services is a key challenge in networking delay-sensitive application, the disclosed systematic framework can provide an optimal path search and computation. The disclosed framework can be based on a novel Time Series (TA) model and adaptive heuristic mechanisms to efficiently optimize paths search and improve end-to-end QoS for networking traffic delivery.

The disclosed technology can address a variety of scenarios, including a communication scenario in E2E services where end user devices transmit and receive traffic at a fixed rate across an SDN-enabled environment, likely using multiple paths. A set of switches that support the popular OF, a communication protocol which allows for accessing (1) the forwarding plane of a switch as well as (2) controller-switch communication to enable state update functions can be included. The disclosed technology can include, for example, deployment OF v 1.5.1, but the disclosed framework can be qualitatively applicable to recent versions of OF as well. The disclosed technology and frameworks can address, for example, the network communication delay of each E2E service, where statistics calculation and path updates in a topology are contributing factors in the E2E delivery delay of networking packets.

In SDN delay-centric applications, an efficient flow routing implementation can aim at minimizing its average delay, a maximum delay, or both. However, while guaranteeing the QoS experience at end users' level is satisfactory, the average E2E delay should be optimized or at least bounded by a certain level of tolerance. Thus, it can be of an interest to guarantee a close-to-optimal E2E delay to ensure an efficacious usage of link capacity and resources. Furthermore, the overhead associated with statistics collection and path updates can play a significant role in the E2E delay and packet processing latency at the switch level. Thus, the SDN capability can be used to guarantee a responsive control to support the overall flow forwarding delay remains another question of interest. Optimizing the overhead of controller-switch communications through the reduction of statistics inquiries and amount of flow rules generated by the controller can be another challenge.

Enlightened by the topological statistics offered by the controller software, the disclosed technology can provide a mechanism that leverages both the global control and centralized view of the SDN to optimize the E2E latency, including both latencies associated with path search and selection and controller-switch communication. While considering the aforementioned challenges, the disclosed technology can include a design and framework that leverages various techniques, such as:

1) traffic engineering; leveraging empirical latency measurements with a heuristic-based approach to compute and select optimal paths such that the E2E delay is optimal, and 2) statistics and flow rules offloading; defining strategies to reduce the impact and overhead of the control channel latency to speedup flow rule processing and improve statistics collector module at the controller level.

The disclosed technology can address and solve a variety of problems, such as the following:

1) Statistics overhead and collection: The software design of OVS devices, statistics collection, and flow rules management can yield for a significant overhead and can thus result in an E2E delay and packet processing latency increase. The challenge here can be in reducing the impact and overhead associated with topology statistics inquiries. Therefore, the disclosed technology can define a metrics matrix (MM) to trace statistics measurements (e.g., per-switch latency, Rx speed, Tx speed, and hop counts) per a time interval I. MM can be used to estimate a link cost to solve our path search problem, which is detailed next. MM can present an SDN topology, which is a weighted graph G=(V;E), where V is a set of all graph vertices, each representing a switching devices and E represents a set of physical links (a client-switch or switch-switch link). For each link e∈E, let L(e) represents the current per-link metrics of a path connecting a pair of nodes. Moreover, MM will include the respective weight function on each link e∈E, which is the weight of a link e, written as w(e). Another challenge here can be how to elaborate the matrix of traces and what networking metrics (i.e., links and devices) that can be used to collect while considering the statistics collection overhead.

2) Latency metric estimation: As the controller offers substantial statistics about the networking topology featured by its global view, the disclosed technology can extract, filter, and deploy specific link and device statistics with respect to the communicating pairs of nodes. However, the technical problem to be addressed and solved can include, for example, what estimation model should be used to heuristically compute the optimal path. In a typical communication scenario between a given pair of nodes, such a model can optimally estimate the latency associated with links in the respective path. The estimated latency metric can help with selecting the optimal path to forward network flows for a fixed time interval I. Because of the dynamicity in network topologies, the estimated values of latencies should be valid for only a fixed interval I. Such a mechanism aims at reducing the overhead of statistics collection via SDN Rest API that affects the management plane as well as the per-switch latency (for instance, to measure and collect a latency metric within OF switches only, the controller can to communicate multiple LLDP packets with switches in repetitive short time intervals which is an overhead).

3) Optimal path selection: To achieve reliable E2E QoS, the disclosed technology may ensure network packets are routed over optimal paths while meeting rigorous service guarantees. Thus, a forwarding plan for unicasting network traffic by the controller can be computed according to stringent optimality criteria. Our routing mechanism can explicitly compute a latency-satisfying route between communication entities. However, as the networking topology is dynamic, the minimum cost weighted path may not guaranteed to always result in an optimal path. Therefore, the disclosed technology can include a path selection mechanism able to conjunctively consider more than one link metric (e.g., Tx, Rx, and the transmission and reception utilization per internal link).

Quality of Service (QoS) is the qualitative measurement of the overall performance of networking-enabled services such as E2E communication delays. Delivering such a QoS in an SDN environment can be of a great benefit towards guaranteeing a reliable and efficacious communications network for various networking applications. In the past, several efforts have dealt with the performance of OF devices. However, such efforts have not offered efficient mechanisms with regard to applications that demand tight optimization at the control plane level. The disclosed technology can solve this and/or other problems. For example, the disclosed technology provides a solution that enhances the routing scalability and ensures QoS reliability to stationary nodes. In another example, the disclosed technology can provide link cost estimation based on time series (TS) and/or an adaptive heuristic approach for optimal path search and selection, such as by providing and using a per-link latency calculation in networking-enabled environments.

Figure 1:
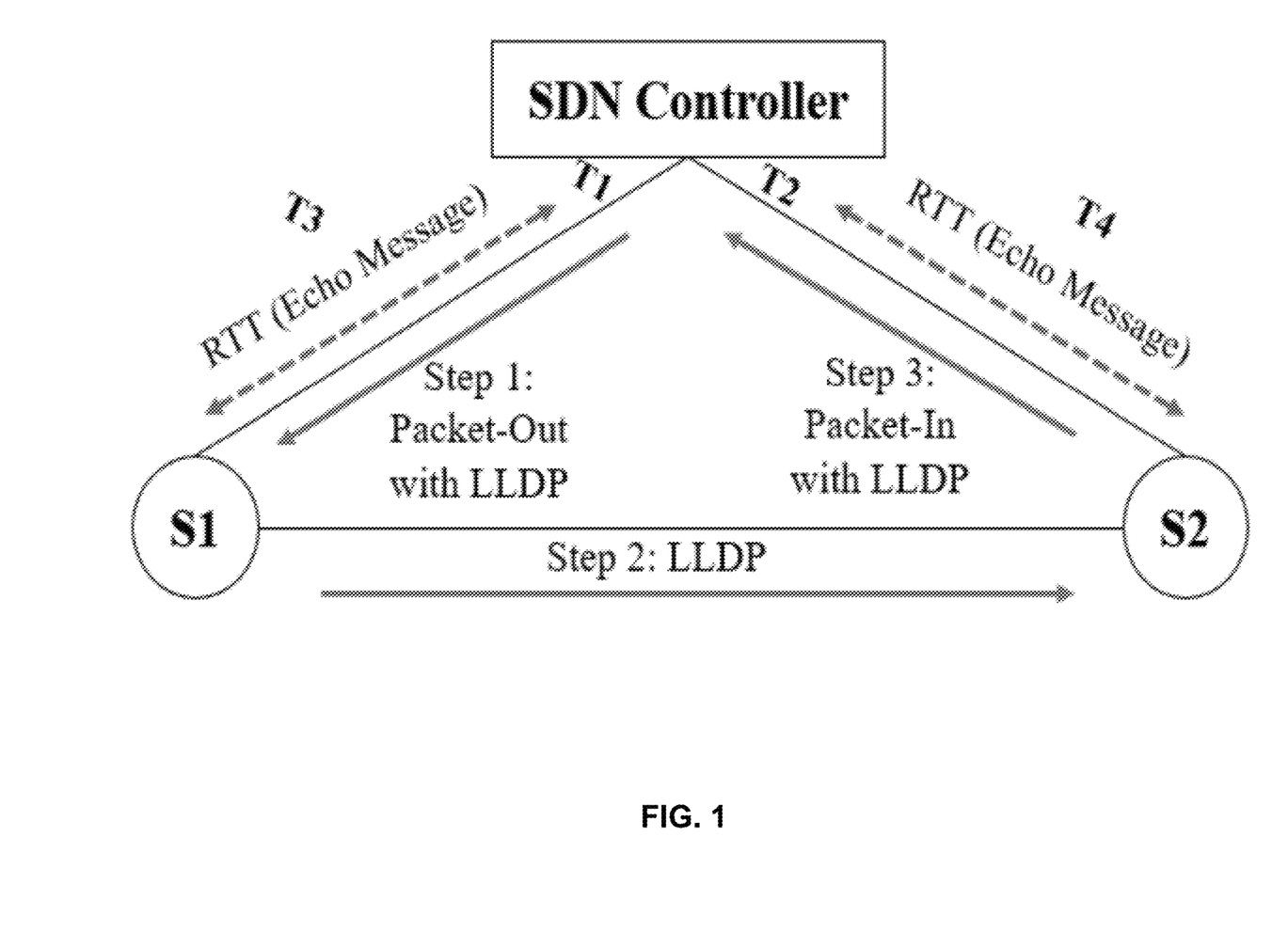
FIG. 1 depicts an example of latency estimation by an example SDN controller.

FIG. 1 depicts an example of latency estimation by an example SDN controller. For example, in a recent version of Floodlight SDN controller software (V1.2), the link latency can be computed by injecting timestamps into Link Layer Discovery Protocol (LLDP) packets and sending these packets as packet-outs to each SDN-enabled forwarding device in the network as shown in FIG. 1. When the controller receives one of its own LLDPs on a neighboring switch and processes it as a packet-in, it will then examine the timestamp in the LLDP packet and subtract it from the current time as called elapsed time. Furthermore, the latency (LatL) of a link can be defined as this elapsed time minus the control plane latency of the origin switch and the control layer latency of the SDN switch that sent the packet-in, as presented in the following equation:

$$Lat_L[C_t-LLDP_t]-Lat_{SO}-Lat_{SS}, \quad (1)$$

where $C_t$, $LLDP_t$, $Lat_{SO}$, and $Lat_{SS}$ represent the current time, the timestamp in the LLDP packet, the control plane latency of the origin switch, and the latency of the switch that sent the packet-in, respectively. This can be an approximate calculation, since there is an error presented in tracking the control plane latency to each switch. For this reason, Equation (1) may only give an approximate calculation for the link latency in data center environments, where latencies are submilliseconds. Another reason for inaccuracy can be that the clock implementation used in the SDN controller has millisecond precision. For instance, if a latency is manually added/set into a particular internal link to 10 milliseconds, there should be a noticeable impact of this latency on the link.

However, the disclosed technology can use the following LLDP-based latency computation instead:

$$t\_lldp\_tx-t\_lldp\_rx-lat\_tx\_ovs-lat\_rx\_ovs, \quad (2)$$

where t_lldp_tx, t_lldp_rx, lat_tx_ovs, and lat_rx_ovs represent the initial timestamp of the LLDP packet, the trip timestamp, the latency in neighboring switch that receives and sends out the LLDP packet to next switch, and the latency in the next hop switch, respectively. The only constraint herein can be that we should allow our networking environment to stabilize for about 60 seconds prior to reading the per-link latency values.

The default SDN configuration can enable communication networks without QoS support and thus the E2E performance of network applications and services can be affected, where the Round Trip Time (RTT) of networking traffic is of a great concern. The RTT instability can be affected by various metrics, such as (1) the network congestion, (2) in/outbound latency within SDN switches, and (3) the dynamics of networking topology. The disclosed technology, in contrast, can leverage the controller global view and latency metric computation capability to feed a TS estimator module for per-link latencies estimation as described below with regard to FIG. 2.

Figure 2:
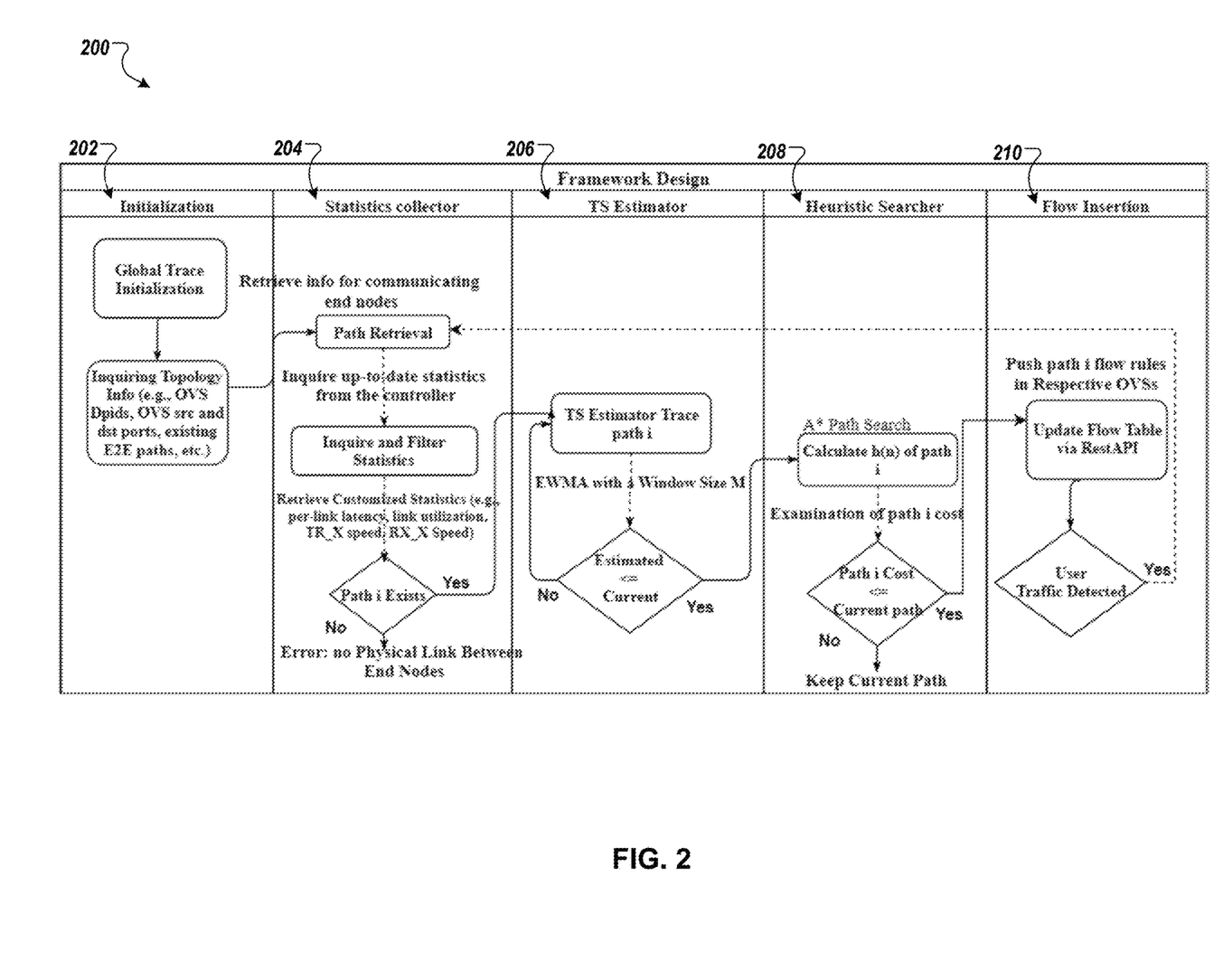
FIG. 2 is a flowchart of an example process and design for a latency optimization framework.

FIG. 2 is a flowchart of an example process and design for a latency optimization framework 200. The traffic circulation in a networking environment can be susceptible to the network dynamicity (e.g., congestion and link failures), and thus stringent QoS may not guaranteed and network packets might be delayed, un-sequenced, or even fail to reach their final destinations. The E2E delay can vary randomly and it can be associated with several delays introduced by each potential node on the traffic path from a source to destination. The framework 200 can include modules 202-210, which include an initialization module 202, a statistics collector 204, a TS estimator 206, a heuristics searcher 208, and a flow insertion module 210. Each of the modules 202-210 can perform the steps and process flows that are depicted in FIG. 2, and can interact with the other modules 202-210 as shown in FIG. 2. For example, the statistics collector 204 can perform the LLDP-based latency computation and collection as described above with regard to Equation 2 as part of the process that is depicted in FIG. 2.

Regarding the TS estimator 206, since TS are time dependent, the linear regression model assumption that the experimental statistics are independent may not hold in this case. Moreover, along with a descending or ascending trend, TS may have a particular form of seasonality trends (the variations are herein specific to a specific time window). For instance, once a per-link latency in a path between a pair of nodes over a time frame during idle connectivity is collected, higher latencies under the occurrence of burst traffic could be invariably estimated. The E2E flow latency in a networking environment can vary randomly as it may be susceptible to dynamic changes of network traffic such as the link condition and its traffic rate.

The TS estimator 206, which can provide TS-based latency estimations, can use the measured statistics of per-link latency as time series observations (provided by the statistics collector 204) and the realization of a random process during time $X_t$ as assumptions. For each t, $X_t$ can be a time dependent random variable on which there is a realization, where t represents the number of samples (pace in milliseconds), according to the overhead tolerance in the framework 200.

Due to its holistic and global view, the SDN controller can supply a broad range of topology statistics including, but not limited to, inter-switch statistics and per-link (internal and external link) measurements (e.g. link speed, transmission speed, reception speed, overall link utilization, etc.). However, every time statistics are inquired and collected by the statistics collection module 204 from the controller through, for example, Rest API, significant overhead can occur at both the SDN and switch level and therefore the E2E latency associated with network content delivery can be affected. In order to reduce statistics inquiries through the SDN Rest API, the TS estimator 206 can adopt a TS model to estimate link metrics, in particular, per-link latency for a fixed window size based on current topological statistics. For example, as discussed below, a weighted moving average (WMA) can be used as part of a TS-based model for the per-link latency metric estimation in in the estimation module 206.

Denoting the N successive time instances when observations of the per-link latencies are made at t=1; 2; . . . , N, the TS estimator 206 can acquire the TS that represents values of per-link latencies in a particular E2E path, i.e., z(t)=(z(1); z(2); . . . ; z(N))=($z_1$; $z_2$; . . . ; $z_N$). In such a TS model, there are N random variables distributed according to N probability density functions $f_1(z_1)$; $f_2(z_2)$; . . . ; $f_N(z_N)$. Such a sequence of N collections provided by the statistics collector 204 of latency metric values observed by the SDN controller $z_1$; $z_2$; . . . ; $z_N$ can be referred to as our sample realization of perlink latencies.

The framework 200 can use a moving average technique for a network bandwidth estimation that includes averaging recent measurements within a window size M. The framework 200 can further use an exponentially weighted moving average (EWMA) model in the latency estimator module 206, which will utilize perlink latency values computed by the controller (as described above), where $Z_i$ and computation of a new estimation $Y_i$ can be provided as follows:

$$Y_i = \theta_i Y_{i-1} + (1-\theta_i) Z_i. \quad (3)$$

The framework 200 may adopt and use such an estimation approach for a per-link latency in networking-enabled environments. The challenge in such a technique, however, cn be the initialization of the exponential weight θ. If θ is chosen large, the previous estimates will be given more importance and therefore, the E2E path latency estimation may not reflect the current network changes and dynamicity. On the other hand, if θ is rather too small, an estimation agility may be achieved. However, the estimation model used by the TS estimator 206 can be adaptive such that the value of $\theta_i$ is defined according to the current measurements circumstance as follows:

$$\theta_i = \frac{\gamma \Lambda}{\sum_{t=i-M}^{i}(Z_t - Z_{t-1})}, \quad (4)$$

$$\Lambda = |Z_{max} - Z_{min}|, \quad (5)$$

where $\Lambda$ is the difference between the maximum and minimum observations of per-link latency within the window size M. In the estimation module, the TS estimator 206 can, for example, initialize M and γ at 10 and 15, respectively. These initialization values can be empirically chosen in a way that considers both network topology dynamics and statistics collection module overhead. However, one of the challenges here can be the stability of latency metric measurements at the controller level. The collected per-link latencies can be sometimes unchanged and therefore Equation (5) cam lead to a division by 0. To solve such a challenge, the weight $\theta_i$ can be statistically initialized, for example, to 0.5 if the observed per-link latencies are constant within a time frame in M.

Regarding the heuristic searcher 208, A* is widely used for graph traversal and path-finding due to its accuracy and performance. A* can be a particular case of the best-first search, where the heuristic evaluation function f(x) can be defined as follows:

$$f(n) = g(n) + h(n), \quad (6)$$

where n is the next node on the path, h(n) is the heuristic function to predict the path with the lowest cost from n to the target node and g(n) is the actual cost of the path from the initial source to the current node n. In the heuristic searcher 208 (also referred to as the path selection module), the heuristic function h(n) can be used to control the behavior of the A* algorithm. If h(n) is 0, then only the actual cost, g(n), plays a role and A* behaves in this case, for example, as the Dijkstra algorithm for the shortest path selection. If h(n)=g(n), it means that the heuristic estimation can be equal to the actual cost moving from node n to the destination and therefore, A* can quickly follow the best path and never expand anything else. On the other hand, if h(n)>g(n), then A* may not be guaranteed to compute the optimal path even though it runs faster. In order for the path selection module 208 to find the optimal path, the condition h(n)<=g(n) should be satisfied, meaning that the total path latency should be lower than or equal to the actual cost moving from the current node n to the target node. In the framework 200, the path selection module 208 can calculate the optimal path based the output of the latency estimation module as follows:

$$f(n) = g(n) + \theta_i Y_{i-1} + (1-\theta_i) Z_i. \quad (7)$$

The search heuristic h(n) can be implemented in the path selection module 208 for the heuristic search of the optimal path from a node n to a target node. Assuming h(n) uses only readily obtainable per-link latency estimations obtained from the latency estimation module 206 about a node n, h(n) can be basically extended as a set of paths between two communicating nodes.

$$h(<n_0, \ldots, n_k>) = h(n_k). \quad (8)$$

At the satisfaction of the A* algorithm optimality condition, the framework 200 will get the optimal E2E path as long as the following condition is fulfilled.

$$\theta_i Y_{i-1} + (1-\theta_i) Z_i \leq g(n). \quad (9)$$

The A* in the path selection module 208 can be capable of dynamically varying its demeanor according to our calculated heuristic h(n). The trade-off between speed and efficiency can be leveraged to render our implementation of path selection faster. However, the framework 200 may not strictly need the shortest path between designated end nodes. In some cases, the framework 200 may only need to compute an optimal path that is close to the shortest path depending on the dynamics of a networking topology.

The adopted A* algorithm for the framework 200 is described below in the example algorithm provided in pseudo code. The goal and source nodes are denoted by $node_{goal}$ and $node_{start}$, respectively. Throughout the implementation there can be two lists that are maintained—OPEN and CLOSED. OPEN refers to a list of pending tasks (nodes that are visited but not expanded and their successors are not searched yet), while CLOSED refers to a list of nodes that have already been visited and expanded where the successors have been explored and placed in the OPEN list.

```
Initialize OPEN list & TS – estimator with M = 10 ;
while the OPEN list is != empty do
|          f(node_c) = g(node_c) + h(TS – estimator(node_c));
|          if node_c is node_g then
|          |       return path & break ;
|          end
|          Generate each state node_s that comes after node_c;
|          for each node_s of node_c do
|          |       Set successor _cost = g(node_c) +
|          |         h(TS – estimator(node_c, node_s));
|          |       if node_s is in the OPEN list then
|          |       |       if g(node_s) ≤ successor _cost then
|          |       |       |       continue (to line 20);
|          |       |       end
|          |       else if node_s is in the CLOSED list then
|          |       |       if g(node_s) ≤ successor _cost then
|          |       |       |       Continue to line 20;
|          |       |       end
|          |       Move node_s from the CLOSED list to the OPEN
|          |         list;
|          |       else
|          |       |       Add node_s to the OPEN list;
|          |       |       Set h(node_s) to be the heuristic distance to
|          |       |         node_g;
|          |       end
|          |       Set g(node_s) = successor _cost;
|          |       Set the parent of node_s to node_c;
|          end
|          Add node_c to the CLOSED list;
end
```

Figure 3:
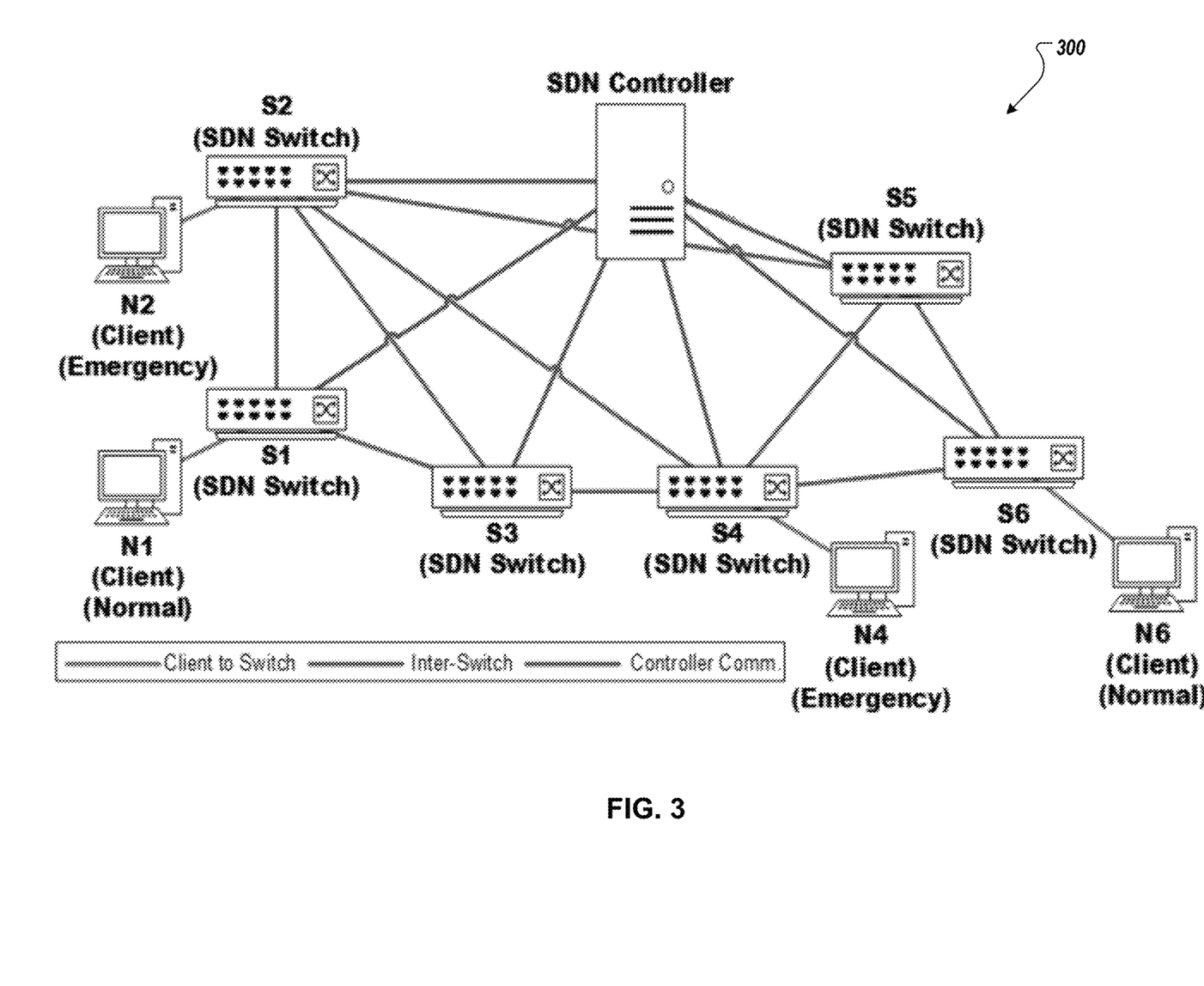
FIG. 3 depicts an example SDN topology.

FIG. 3 depicts an example SDN topology 300. For example, the depicted example SDN topology 300 depicted in FIG. 3 can be used to evaluate the framework 200 and to conduct a comprehensive empirical examination of the E2E latency. As part of this evaluation, three key constraints for the SDN-enabled topology were considered, including: (1) An environment with opensource SDN controller and updated OF software, (2) a software module for networking traffic emulation, and (3) a networking topology with multiple paths and physical links with changeable loss rate and throughput. This example topology can be designed over, for example, Global Environment for Network Innovation (GENI), a real-world federated and heterogeneous testbed solution, which allows for the construction of a topology with the aforementioned properties while benefiting from the inter-domain network communication over the Internet to handle areas of realism.

Furthermore, in order to comprehensively examine the E2E latency over distant geographic regions (i.e., multiple sites), the SDN topology 300 can include interconnecting GENI nodes from, for example, Lexington, Ky., Cleveland, and Louisiana using a stitched topology 300 feature, as shown in FIG. 3. The stitching capability in GENI testbed supports inter-connecting nodes from multiple aggregates (e.g., cities) into a coherent topology. In the architectural design of the disclosed topology 300, a variety of technologies can be deployed, such as Open vSwitch (version 1.5.1) and Floodlight 1.2, an open-source SDN controller.

In the preliminary evaluation of the framework 200 as tested using the topology 300, testing examined the percentage relative error of per-link latency calculations. Herein, this included measuring the difference between estimated calculations based on the TS model and the actual values calculated by the controller (RTT) as follows.

$$\text{Error} = \frac{Latency_E - Latency_A}{Latency_E}, \quad (10)$$

$$\text{Error} = \frac{[\theta_i Y_{i-1} + (1-\theta_i) Z_i] - Latency_A}{\theta_i Y_{i-1} + (1-\theta_i) Z_i}, \quad (11)$$

Figure 4:
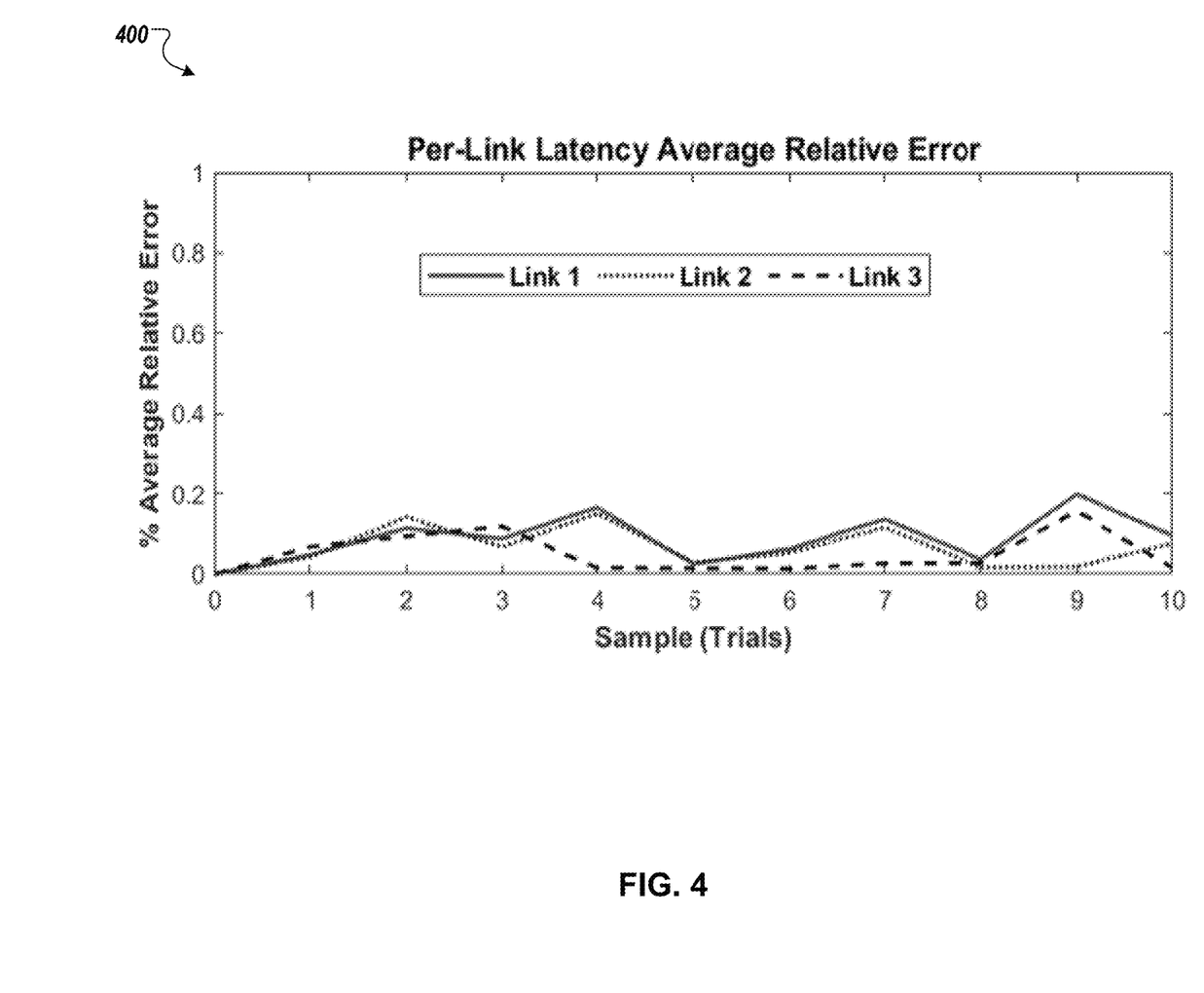
FIG. 4 depicts a graph plotting an average relative error of individual links in a single E2E path.

FIG. 4 depicts a graph 400 plotting an average relative error of individual links in a single E2E path. The graph 400 depicts the percentage average relative error of multiple links in a single E2E path as a function of collected (actual latency values observed by the controller) and estimated latencies (calculated by our latency TS estimator module), where the X-axis presents the calculation trials. The examined path herein between end nodes N1 and N6 where Link1, Link2, and Link3 represent the inter-switch link S1→S3, S3→S4, and S4→S6, respectively. Noting that at the initial phase of the framework, the estimated latencies are equal to the actual ones as the TS estimator of window size M averages the first observed per-link latency value to be the actual latency observed by the controller through our RestApi-based statistics collector module. With the increase in observed latency values, accuracy of latency estimation of the path improves and the average error rate remains below 0.2 as illustrated in the graph 400.

Figure 5:
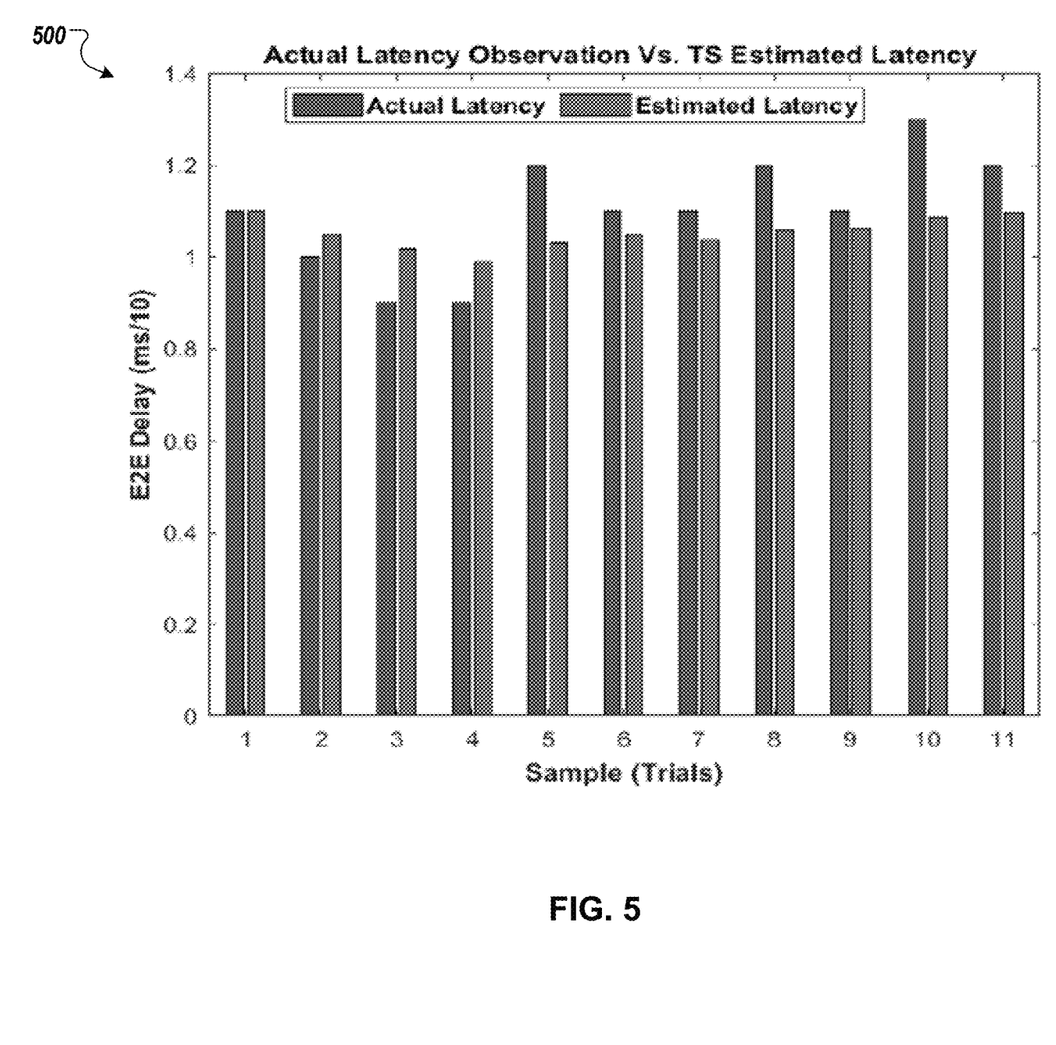
FIG. 5 depict a graph demonstrating path optimality through a comparison between actual path cost and estimated one by the disclosed framework.

FIG. 5 depict a graph 500 demonstrating path optimality through a comparison between actual path cost and estimated one by the disclosed framework. In order to evaluate the optimality condition for the adaptive A* algorithm used in the framework 200, testing considered evaluating and contrasting the actual path cost to the estimated cost utilized by the A* algorithm for path selection. As discussed below, the A* algorithm can return an optimal path as long as the heuristic condition h(n)<=g(n) is satisfied. The graph 500 shows both actual latency values and estimated one based on the TS estimator module 206. As depicted in the graph 500, the actual path cost is smaller than the estimated one only at the initial TS estimator phase as the moving average of the first couple collected values of per-link latency is likely to be higher than the actual path cost.

The following table details a % improvement of the average E2E latency in LatencySmasher (disclosed technology) with contrast to the default path selection algorithm (Dijkstra) in Floodlight for nodes $N_1$, $N_2$, and $N_3$ communicating with Ns simultaneously:

| Measurement Statistics | Node $N_1$ | Node $N_2$ | Node $N_3$ |
|---|---|---|---|
| Mean | 3.07% | 6.41% | 4.51% |
| Median | 3.82% | 5.95% | 5.07% |

Figure 6:
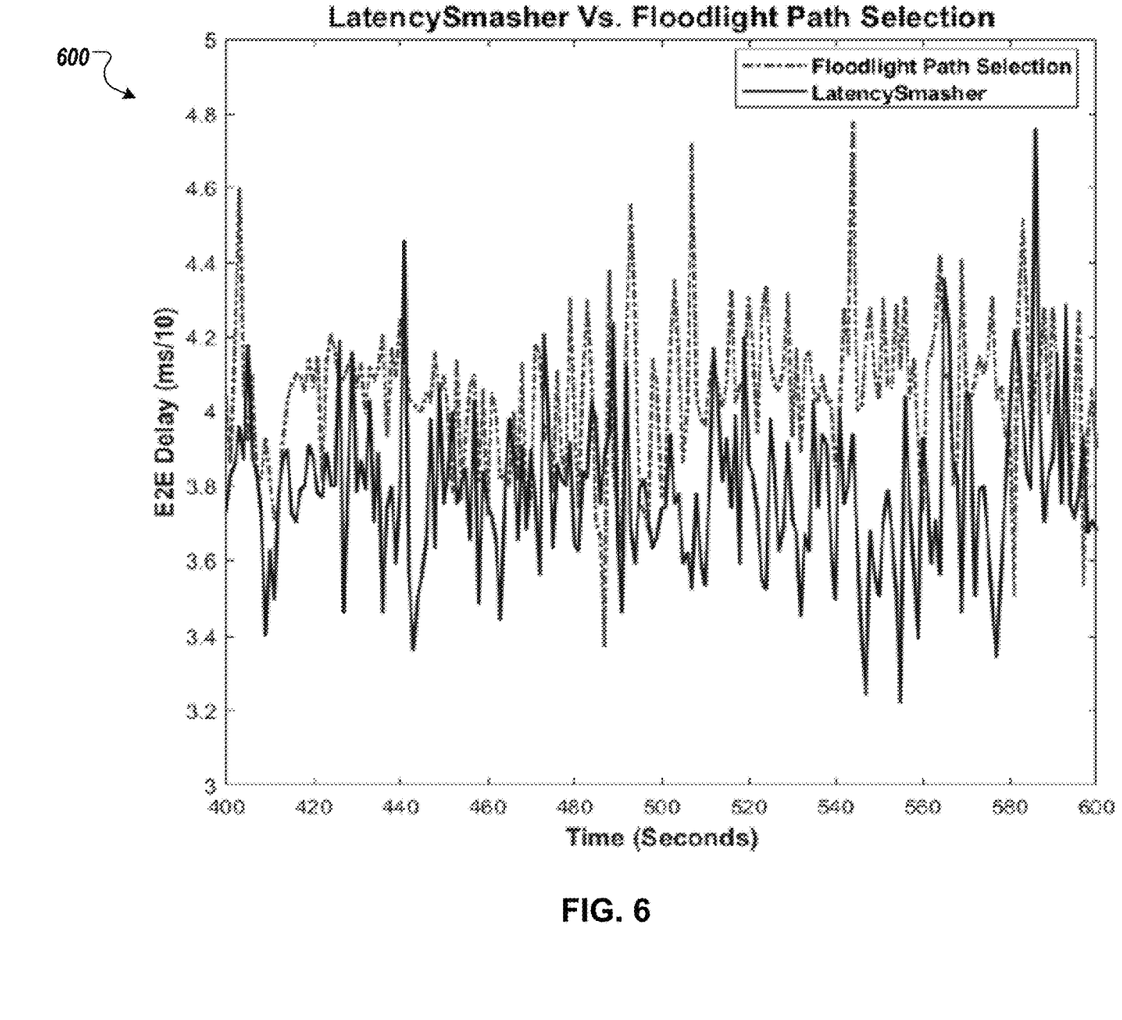
FIG. 6 depicts a graph providing a comparison of E2E delay between an example disclosed A*-based approach and the default algorithm deployed in Floodlight.

FIG. 6 depicts a graph 600 providing a comparison of E2E delay between an example disclosed A*-based approach and the default algorithm deployed in Floodlight. The graph 600 demonstrates a throughout comparison between the adaptive A* approach of framework 200 and Dijkstra, the default path selection algorithm used by Floodlight for path search and selection. In this experimental scenario, N1 and N6 are designated as a source node and a target node, respectively. This figure shows that our framework outperforms the path selection mechanism adopted by Floodlight with regard to E2E latency minimization. As long as the heuristic optimality condition holds (as discussed above), the framework 200's adaptive A* algorithm can only expands on a node if it seems promising and aims at reaching the destination node as quickly as possible rather than expanding every other node like the Dijkstra algorithm. Moreover, the path selection module in our framework may be invoked only when a better cost estimate for the current path is claimed by the TS estimator module 206. Therefore, such a mechanism can reduce a communication overhead at the switch-controller level. Furthermore, the table above presents the percentage improvements in E2E latency provided by LatencySmasher with regard to the default Dijkstra mechanism for path search and selection integrated in Floodlight. That table shows that the disclosed SDN-enabled framework 200 reduces at least 3% of the E2E latency for the different nodes communicating with server node N6.

Figure 7:
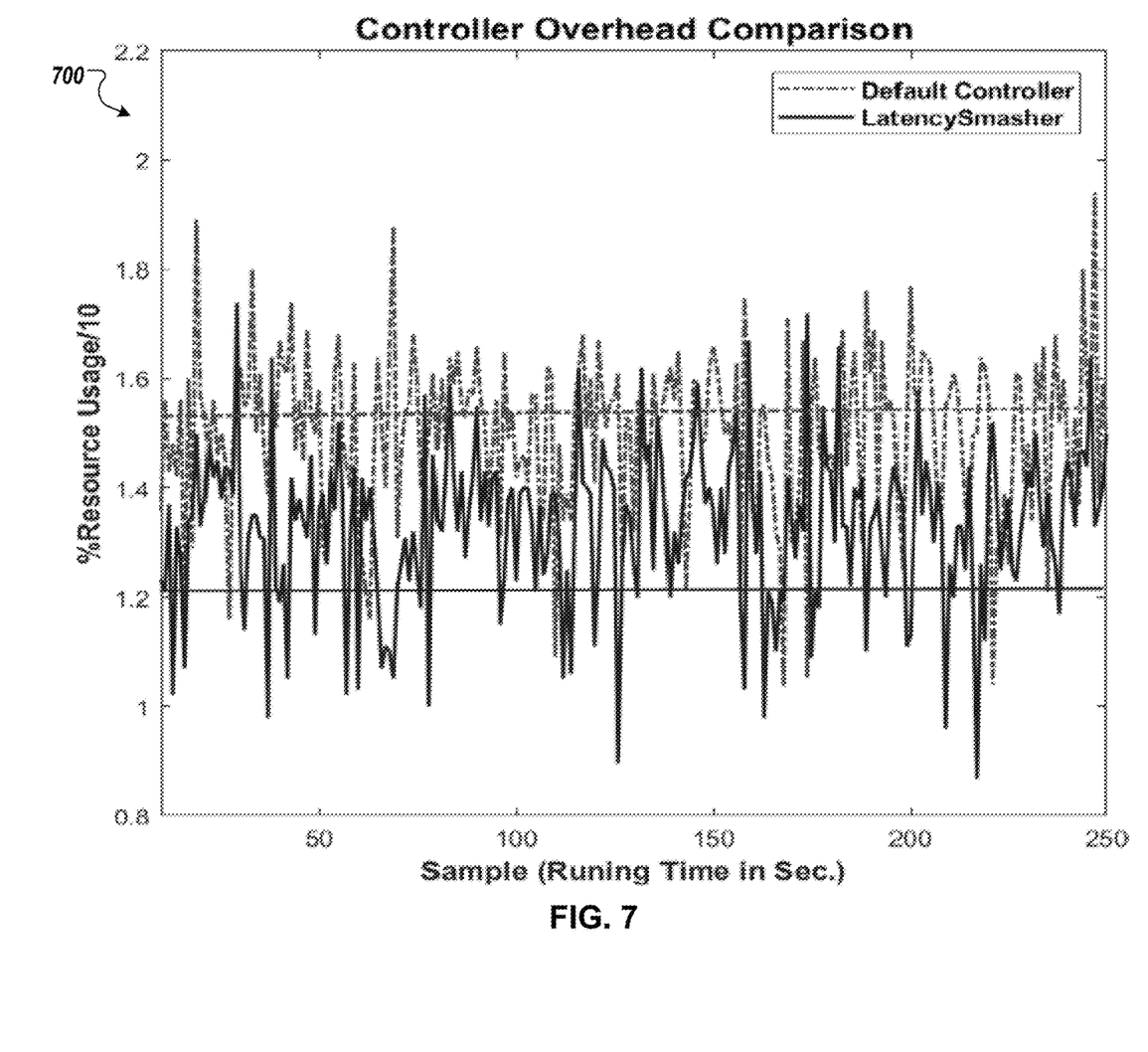
FIG. 7 depicts a graph showing an example overhead comparison between the disclosed framework and the default Floodlight, including horizontal lines showing the average overhead.

FIG. 7 depicts a graph 700 showing an example overhead comparison between the disclosed framework and the default Floodlight, including horizontal lines showing the average overhead. The graph 700 shows a comparison in term of resource utilization (i.e., overhead) between our framework and the default Floodlight SDN controller software. The graph 700 demonstrates that LatencySmasher outperforms Floodlight with default implementation. This is due, in part, to the statistics collection overhead by Floodlight SDN controller. Once the default statistics collection feature is enabled in the unoptimized controller, a large amount of unnecessary topology and E2E perlink statistics can be periodically (every 10 seconds by default) calculated and collected which result in both controller and switch overhead. However, the framework 200 can request particular per-link statistics only when networking traffic is initiated by an end node and pushes new flow rules when an alternative path with a better cost is estimated. Compared to the default path search in Floodlight (Dijkstra), the overhead in the framework 200 can be minimized because the adaptive path search approach may only expand on a node if its heuristic cost (which is calculated by the TS estimator module 206) is satisfactory smaller than the current cost to reach the target node.

This document discloses a systematic framework to minimize E2E communication delay and reduce latency associated with controller-switch communication. An adaptive A* algorithm can be used for selecting optimal paths to deliver traffic from E2E. Moreover, a TS model can be used to predict the per-link latency over recent statics at RestAPI application level. These estimates are communicated to the heuristic function of A* algorithm to compute the next hop in a path. The experimentation was performed based on a continent-scale topology built on GENI, a real-world testbed to experimentally verify the efficiency of our framework. The disclosed technology can be extended, including integrating the framework into multi-domain SDN and deploying other QoS metrics such as identifying traffic of varying priorities and thus routing it according to the respective priority level.

Figure 8:
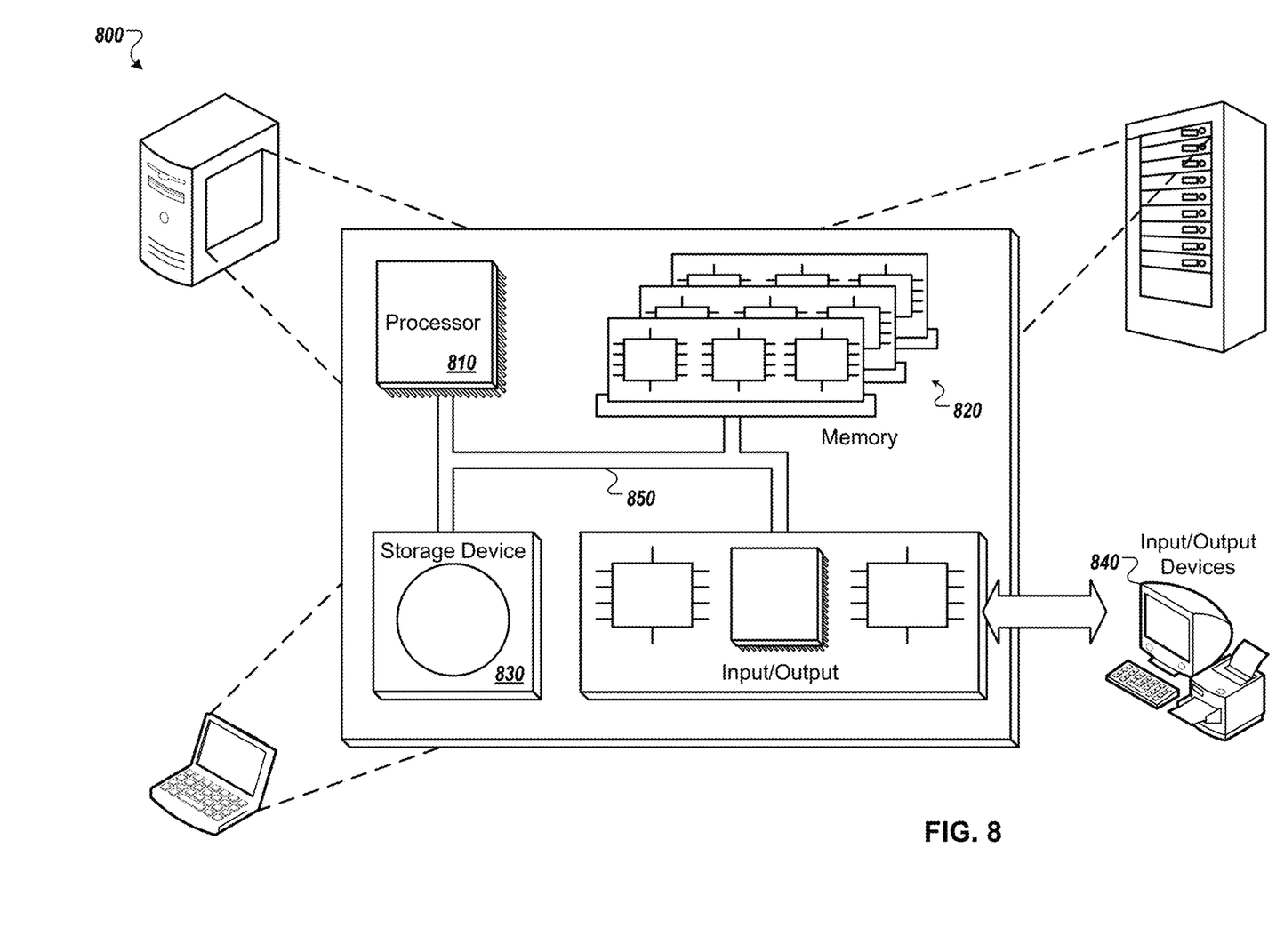
FIG. 8 is a schematic diagram that shows an example of a computing system.

FIG. 8 is a schematic diagram that shows an example of a computing system 800. The computing system 800 can be used for some or all of the operations described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computing system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device.

The input/output device 840 provides input/output operations for the computing system 800. In some implementations, the input/output device 840 includes a keyboard and/or pointing device. In some implementations, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The invention claimed is:

1. A network latency optimization system comprising:
a statistics collection processor configured to receive network topology information for a plurality of end nodes of a network, and maintain, for a pair of end nodes, one or more communication network topology statistics that change over time as the received network topology information is dynamic and changes over time;
a time series based latency estimation processor configured to maintain in SDN controller memory, for a path between the pair of end nodes, an estimated per-link latency, based on the received network topology information; wherein maintaining in SDN controller memory the estimated per-link latency comprises iteratively performing operations comprising:
accessing the communication and network topology statistics;
based on changes to the communication and network topology statistics, dynamically updating one or more parameters of an exponentially weighted moving average model that includes a first parameter for an exponential weight and a second parameter for a window size; and
a path selection processor configured to determine an optimal path between the pair of end nodes, in response to the estimated per-link latency being less than or equal to a current link latency between the pair of end nodes.

2. The system of claim 1, wherein the one or more communication and network topology statistics include one or more of a per-link latency, a transmission speed, a reception speed, and a link utilization.

3. The system of claim 1, wherein determining the one or more communication and network topology statistics for the plurality of end nodes includes determining a current link latency in a path between a pair of end nodes, the current link latency being based on an initial timestamp of a link layer discovery protocol (LLDP) packet, a trip timestamp, a latency in a neighboring switch that receives and sends out the LLDP packet to a next switch, and a latency in the next switch.

4. The system of claim 1, wherein the communication and network topology statistics that change over time include information about changes to at least one of the groups consisting of network topology dynamics and statistics collection overhead.

5. The system of claim 1, wherein determining the optimal path between the pair of end nodes includes using a best-first search, and maintaining (i) a first list of nodes that have been visited but not expanded, and (ii) a second list of nodes that have been visited and expanded, with successor nodes having been explored and placed in the first list.

6. The network latency optimization system of claim 1, further comprising a flow insertion processor configured to:
access the optimal path between the pair of end nodes; and
update a flow table such that data passed by the network between the pair of end nodes is routed along the optimal path.

7. The network latency optimization system of claim 1, wherein the communication and network topology statistics change over time due to an unexpected condition including at least one of the groups consisting of (i) congestion and (ii) one or more link failures.

8. A method for minimizing end-to-end latency within a software defined network, the method comprising:
receiving network topology information for a plurality of end nodes of a network;
maintaining, for a pair of end nodes, one or more communication and network topology statistics that change over time as the received network topology information is dynamic and changes over time;
maintaining, in SDN controller memory, for a path between the pair of end nodes, an estimated per-link latency, based on the received network topology information; wherein maintaining in SDN controller memory the estimated per-link latency comprises iteratively performing operations comprising:
accessing the communication and network topology statistics;
based on changes to the communication and network topology statistics, dynamically updating one or more parameters of an exponentially weighted moving average model that includes a first parameter for an exponential weight and a second parameter for a window size; and
determining an optimal path between the pair of end nodes, in response to the estimated per-link latency being less than or equal to a current link latency between the pair of end nodes.

9. The method of claim 8, wherein the one or more communication and network topology statistics include one or more of a per-link latency, a transmission speed, a reception speed, and a link utilization.

10. The method of claim 8, wherein determining the one or more communication and network topology statistics for the plurality of end nodes includes determining a current link latency in a path between a pair of end nodes, the current link latency being based on an initial timestamp of a link layer discovery protocol (LLDP) packet, a trip timestamp, a latency in a neighboring switch that receives and sends out the LLDP packet to a next switch, and a latency in the next switch.

11. The method of claim 8, wherein the communication and network topology statistics that change over time include information about changes to at least one of the groups consisting of network topology dynamics and statistics collection overhead.

12. The method of claim 8, wherein determining the optimal path between the pair of end nodes includes using a best-first search, and maintaining (i) a first list of nodes that have been visited but not expanded, and (ii) a second list of nodes that have been visited and expanded, with successor nodes having been explored and placed in the first list.

13. The method of claim 8, the method further comprising updating a flow table such that data passed by the network between the pair of end nodes is routed along the optimal path.

14. The method of claim 8, wherein the communication and network topology statistics change over time due to an unexpected condition including at least one of the groups consisting of (i) congestion and (ii) one or more link failures.

15. A network latency optimization system comprising:
one or more processors; and
SDN controller memory storing instructions that, when executed by the one or more processors, cause the one or more processors to perform operations comprising:
receiving network topology information for a plurality of end nodes of a network;
maintaining, for a pair of end nodes, one or more communication and network topology statistics that change over time as the received network topology information is dynamic and changes over time;
maintaining, in SDN controller memory, for a path between the pair of end nodes, an estimated per-link latency, based on the received network topology information; wherein maintaining in SDN controller memory the estimated per-link latency comprises iteratively performing operations comprising:
accessing the communication and network topology statistics;
based on changes to the communication and network topology statistics, dynamically updating one or more parameters of an exponentially weighted moving average model that includes a first parameter for an exponential weight and a second parameter for a window size; and
determining an optimal path between the pair of end nodes, in response to the estimated per-link latency being less than or equal to a current link latency between the pair of end nodes.

16. The system of claim 15, wherein the one or more communication and network topology statistics include one or more of a per-link latency, a transmission speed, a reception speed, and a link utilization.

17. The system of claim 15, wherein determining the one or more communication and network topology statistics for the plurality of end nodes includes determining a current link latency in a path between a pair of end nodes, the current link latency being based on an initial timestamp of a link layer discovery protocol (LLDP) packet, a trip timestamp, a latency in a neighboring switch that receives and sends out the LLDP packet to a next switch, and a latency in the next switch.

18. The system of claim 15, wherein the communication and network topology statistics that change over time include information about changes to at least one of the groups consisting of network topology dynamics and statistics collection overhead.

19. The system of claim 15, the operations further comprising updating a flow table such that data passed by the network between the pair of end nodes is routed along the optimal path.

20. The system of claim 15, wherein the communication and network topology statistics change over time due to an unexpected condition including at least one of the groups consisting of (i) congestion and (ii) one or more link failures.

* * * * *